(12) United States Patent
Barnum et al.

(10) Patent No.: US 12,413,628 B2
(45) Date of Patent: Sep. 9, 2025

(54) AUTHENTICATION OF DATA SHARING

(71) Applicant: Capital One Services, LLC, McLean, VA (US)

(72) Inventors: Eric K. Barnum, Midlothian, VA (US); Robert Dwane Wokaty, Jr., Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 979 days.

(21) Appl. No.: 17/453,769

(22) Filed: Nov. 5, 2021

(65) Prior Publication Data

US 2023/0145127 A1 May 11, 2023

(51) Int. Cl.
*H04L 9/40* (2022.01)
*G06F 21/00* (2013.01)
*G06F 21/60* (2013.01)
*G06Q 20/40* (2012.01)

(52) U.S. Cl.
CPC .......... *H04L 63/205* (2013.01); *G06F 21/604* (2013.01); *G06Q 20/40145* (2013.01); *H04L 63/0853* (2013.01)

(58) Field of Classification Search
CPC .............. H04L 63/205; H04L 63/0853; G06Q 20/40145; G06F 21/604; G06F 21/31; G06F 21/32; G06F 21/34
See application file for complete search history.

(56) References Cited

U.S. PATENT DOCUMENTS

| 7,044,368 B1 | 5/2006 | Barron |
| 9,016,584 B2 | 4/2015 | Doughty et al. |
| 2005/0169504 A1 | 8/2005 | Black |
| 2007/0073619 A1 | 3/2007 | Smith |

(Continued)

FOREIGN PATENT DOCUMENTS

EP 1575004 A1 9/2005

OTHER PUBLICATIONS

"Driving cardholder security and convenience," Mastercard, https://www.mastercard.us/en-us/business/overview/safety-and-security/authentication-services/biometrics/biometrics-card.html ; retrieved Sep. 17, 2021.

(Continued)

*Primary Examiner* — Edward Zee
(74) *Attorney, Agent, or Firm* — Harrity & Harrity, LLP

(57) ABSTRACT

In some implementations, a system may receive, from a terminal, an account identifier, an authentication credential, and a request for data associated with a user, wherein the request may identify requested data items associated with the account identifier. The system may authenticate the request using the account identifier and the authentication credential. The system may determine whether the request satisfies a pre-approval condition after authenticating the request. The system may transmit a first message to a user device associated with the user or transmit a second message to a third party device associated with the terminal based on whether the requested data items satisfy the pre-approval condition. The first message to the user device may request approval to transmit the requested data items to the third party device via the second message, and the second message may enable access to the requested data items.

20 Claims, 9 Drawing Sheets

(56) References Cited

U.S. PATENT DOCUMENTS

2009/0084858 A1* 4/2009 Borracci .............. G06K 19/077
235/492
2009/0095810 A1* 4/2009 Cannon ................ G06K 7/0008
235/380

OTHER PUBLICATIONS

"Fingerprint authentication moves from phones to payment cards," Visa, https://usa.visa.com/visa-everywhere/security/biometric-payment-card.html; retrieved Sep. 17, 2021.
"EMV card with fingerprint biometrics—Introducing the biometric payment card," Thales, https://www.thalesgroup.com/en/markets/digital-identity-and-security/banking-payment/cards/emv-biometric-card; retrieved Sep. 17, 2021.

* cited by examiner

AUTHENTICATION OF DATA SHARING

BACKGROUND

Biometric authentication is an identification and/or security process that uses a biologically unique identifier (e.g., fingerprint, voice, iris, retina, or face) of an authorized user (e.g., an account owner or a device owner) to authenticate a user trying to gain access to physical and/or digital resources (e.g., an account or a device). The process includes scanning a biologically unique identifier of the user trying to gain access and comparing the scan to a stored copy of the biologically unique identifier of the authorized user. If there is a sufficient match, then the user is granted access to the physical and/or digital resources.

SUMMARY

Some implementations described herein relate to a system for authentication of data sharing. The system may include one or more memories and one or more processors communicatively coupled to the one or more memories. The one or more processors may be configured to receive, from a terminal, an account identifier, a biometric credential, and a request for data associated with a user based on an interaction between the terminal and a physical medium associated with the account identifier. The biometric credential may be communicated from the physical medium to the terminal. The request may be one of a specific request that identifies one or more requested data items associated with the account identifier, or a general request that does not identify any requested data items. The one or more processors may be configured to authenticate the request using the biometric credential. The one or more processors may be configured to identify user contact information associated with the account identifier based on authenticating the request. The one or more processors may be configured to transmit a message to a user device based on the user contact information, wherein content of the message depends on whether the request is the specific request or the general request. The one or more processors may be configured to receive, from the user device, an indication to approve transmission of the data to a third party device associated with the terminal. The indication may approve transmission of the one or more requested data items if the request is the specific request, or the indication may indicate one or more user-specified data items to be transmitted to the third party device if the request is the general request. The one or more processors may be configured to transmit the data or information that enables access to the data to the third party device based on receiving the indication. The data may include the one or more requested data items if the request is the specific request, or the data may include the one or more user-specified data items if the request is the general request.

Some implementations described herein relate to a method for authentication of data sharing. The method may include receiving, by a system and from a terminal, an account identifier, an authentication credential, and a request for data associated with a user based on an interaction between the terminal and a physical medium that stores the account identifier and the authentication credential, where the authentication credential and the account identifier are communicated from the physical medium to the terminal, and where the request is one of: a specific request that identifies one or more requested data items associated with the account identifier, or a general request that does not identify any requested data items. The method may include authenticating, by the system, the request using the account identifier and the authentication credential. The method may include generating, by the system, content for a message based on whether the request is the specific request or the general request. The method may include transmitting, by the system and based on authenticating the request, the message to a user device based on user contact information associated with the account identifier. The method may include receiving, by the system and from the user device, an indication to approve transmission of the data to a third party device, where content of the indication depends on whether the request is the specific request or the general request. The method may include transmitting, by the system, the data, or information that enables access to the data, to the third party device based on receiving the indication, where the data includes the one or more requested data items or one or more user-specified data items indicated in the indication to approve transmission of the data.

Some implementations described herein relate to a non-transitory computer-readable medium that stores a set of instructions for a system. The set of instructions, when executed by one or more processors of the system, may cause the system to receive, from a terminal, an account identifier, an authentication credential, and a request for data associated with a user based on an interaction between the terminal and a physical medium that stores the account identifier and the authentication credential, wherein the authentication credential and the account identifier are communicated from the physical medium to the terminal, and wherein the request identifies one or more requested data items associated with the account identifier. The set of instructions, when executed by one or more processors of the system, may cause the system to authenticate the request using the account identifier and the authentication credential. The set of instructions, when executed by one or more processors of the system, may cause the system to determine whether the request satisfies a pre-approval condition after authenticating the request. The set of instructions, when executed by one or more processors of the system, may cause the system to transmit a first message to a user device associated with the user or transmit a second message to a third party device associated with the terminal based on whether the one or more requested data items satisfy the pre-approval condition, wherein the first message to the user device is transmitted if the one or more requested data items do not satisfy the pre-approval condition, wherein the second message to the third party device is transmitted if the one or more requested data items satisfy the pre-approval condition, wherein the first message to the user device requests approval to transmit the one or more requested data items to the third party device via the second message, and wherein the second message enables access to the one or more requested data items.

DETAILED DESCRIPTION

Figure 1A:
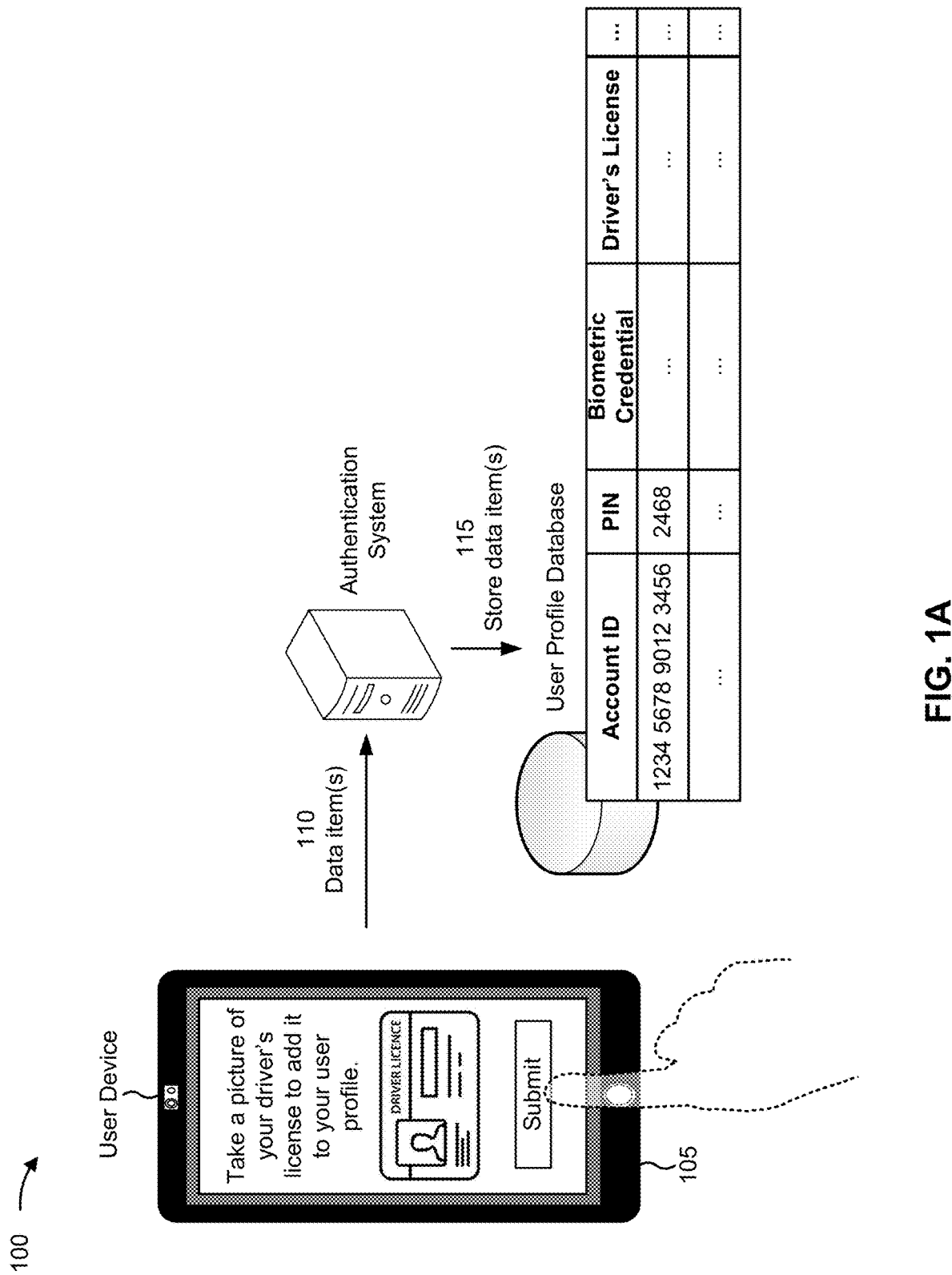
FIGS. 1A, 1B, 1C, 1D, and 1E are diagrams of an example implementation relating to authentication of data sharing.

The following detailed description of example implementations refers to the accompanying drawings. The same reference numbers in different drawings may identify the same or similar elements.

In some instances, a user may be required to share highly personal, private, and/or sensitive information (e.g., Social Security number, driver's license, passport, birth certificate, health history, legal history, credit score, or background check) for a variety of reasons and in a variety of scenarios. Obtaining and providing this information can be cumbersome for the user, and further may present security concerns where the information is provided in a less secure manner and/or forum. Biometric authentication is sometimes used in scenarios requiring heightened security (e.g., access to secure information). For example, a user's fingerprint may be scanned, and the corresponding fingerprint data may be compared with stored fingerprint data. If there is a successful match, then the user's identity is authenticated, and the security measure is satisfied. However, biometric authentication (e.g., fingerprint authentication) still may be exploited (e.g., by lifting a fingerprint pattern from a fingerprint reader that has not been wiped clean), and therefore may be insufficient as the sole security measure.

Some implementations described herein relate to a system for authentication of data to be provided from an authentication system to a third party requesting the data. The authentication system may store data related to an account holder in a user account, such as the account holder's driver's license, contact information (e.g., phone number, account information, email address), or the like. The request for data may be initiated by the third party when a user uses a physical medium to interact with a terminal at a location of the third party. The physical medium may store fingerprint data corresponding to one or more fingerprints (e.g., including thumbprints) of the user, a biometric credential (e.g., a unique identifier generated from the fingerprint data corresponding to the user), and an account identifier associated with the user's account.

During an interaction with the terminal, the physical medium, via a fingerprint scanner on or in the physical medium, may scan a fingerprint of the user. If the corresponding scanned fingerprint data substantially matches the stored fingerprint data, then the physical medium may transmit the biometric credential and the account identifier to the terminal. The terminal may then, in turn, transmit the biometric credential, the account identifier, and a request for data to the authentication system. From the account identifier, the authentication system may identify the user account and a stored biometric credential associated with the user account, which the authentication system may compare to the received biometric credential to authenticate the request. If the authentication system determines that the received biometric credential substantially matches the stored biometric credential, then the authentication system may provide the requested data after receiving approval from the user (e.g., from a user device after transmitting a message to the user device requesting approval) and/or if one or more conditions are met (e.g., the requested data is of a type already pre-approved by the account holder).

Additionally, terminals may have varying capabilities. For example, some terminals may be "smart" terminals capable of providing requests for specific data (e.g., specific requests) tailored to the third party's needs. Other terminals may only be capable of providing general requests (e.g., requests without specifying the particular data needed). The techniques described herein are able to distinguish between different terminals having different capabilities (e.g., specific requests vs. general requests), and still share data in a secure manner regardless of the capability of the terminal.

The use of biometric credentials (e.g., fingerprints) and the involvement of the authentication system in an interaction between the user (e.g., via the physical medium) and the third party (e.g., via the terminal) provides multiple levels of security for providing data requested by the third party. For example, requiring matches in biometric credentials at the physical medium, and then again at the authentication system during the authentication process reduces the likelihood that an unauthorized user (e.g., someone attempting to use the account holder's identity and associated data in the interaction) is able to have the account holder's data transmitted to the third party. Additionally, requiring the account holder's approval to provide the data adds an extra level of security. Furthermore, by having the account holder's data stored by a single source (e.g., the authentication system), different subsets of data may be able to be selectively provided to different third parties from the single location, which saves processing resources and time over obtaining specific data from different sources for each interaction with a particular third party.

FIGS. 1A-1E are diagrams of an example 100 associated with authentication of data sharing. As shown in FIGS. 1A-1E, example 100 includes an authentication system, a user profile database, a user device, a terminal, a physical medium, and a third party device. These devices are described in more detail in connection with FIGS. 2 and 3.

As shown in FIG. 1A, a user (e.g., an account holder) may interact with a user device to provide a data item or items to an authentication system to be stored. Although techniques are described herein in connection with an individual (e.g., a person) as the user, these techniques can be applied to an entity (e.g., a corporation or another type of organization) as the user. The data item or items may be of a personal and/or sensitive nature. For example, a data item may be or may include identification information, driver's license information (e.g., a picture of a driver's license, and/or information indicated by a driver's license, such as a license number, state of issuance, birthdate, address, eye color, issue date, expiration date, photograph of a user, etc.), passport information (e.g., a picture of a passport, and/or information indicated by a passport, such as a passport number, country of issuance, birthdate, address, issue date, expiration date, photograph of a user, etc.), government-issued identification (e.g., a picture of a government-issued identification, and/or information indicated by government-issued identification, similar to information described above), a social security number (e.g., a picture of a social security card, and/or information on the card, such as a social security number), a credit score, birth certificate information (e.g., a picture of and/or information indicated by a birth certificate), vaccination record information (e.g., a picture of and/or information indicated by a vaccination card), a personal identification number (PIN), an authentication credential, a biometric credential, a biometric token, an access identifier, ticket information (e.g., a picture of a ticket for entry into an event and/or venue, and/or information indicated by such a ticket, such as a ticket number, a venue, an event, a number of guests, etc.), and/or information that identifies an age of the user. Additionally, or alternatively, the data items may be static (e.g., a scanned document, text, or a picture) or dynamic (e.g., a video file, such as a video recording, or an audio file, such as an audio recording).

As shown by reference number 105, the user may submit the data item or items (e.g., the user's driver's license) to the authentication system via a user device (e.g., via an application stored on the user device or a web-based application accessed by the user device over a network). For example, the user device may instruct (e.g., present instructions in text on a display of the user device or via voice through a speaker of the user device) the user to provide the data item or items to be stored to the user device, such as by taking a picture of the particular data item or items. Additionally, or alternatively, the data item or items may be obtained from an internal database of the user device (e.g., a camera roll) and/or from a remote server or database (e.g., in a cloud computing environment). Additionally, or alternatively, the user may manually input the data item or items in one or more dedicated entry fields presented on the display of the user device (e.g., via a physical keyboard, a virtual keyboard, or a voice entry). The user may then submit the data item or items (e.g., by pressing a submit button on a touchscreen of the user device or a physical submit or enter button, or by a voice command). In some implementations, the user may interact with the user device to provide permission for the authentication system to access one or more data items, such as one or more data items (e.g., a credit score) that are not stored by the user device and/or are not a physical item.

As shown by reference number 110, the authentication system may receive the data item or items from the user device (e.g., over a network described in more detail below). As shown by reference number 115, the authentication system may store the data item or items in a user profile database under the user's account.

In some implementations, when the user submits the data item or items (e.g., via the user device), the user may be prompted (via the user device) to input additional information about the data item or items, such as an expiration date (e.g., for a driver's license or a passport). Additionally, or alternatively, the authentication system may be able to read, process, and/or store such information from the submitted data item or items (e.g., via optical character recognition (OCR)). When the authentication system detects that a data item has expired or is about to expire (e.g., at a set time before the expiration date), the authentication system may send a message to the user device to indicate that the particular data item needs to be updated and/or replaced.

Additionally, or alternatively, the user may have contact information (sometimes called "user contact information"), such as the user's name, address, phone number, application ID, and/or email address, stored under the user's account in a user profile database. The contact information may be associated with an account identifier (e.g., an account ID number, a primary account number (PAN), or a virtual card number). When the user updates any of the contact information (e.g., a new address), the authentication system may identify any stored data item or items that may be affected by the change (e.g., the user's driver's license). The authentication system may then send a message to the user device to indicate that the particular data item or items should be updated and/or replaced.

The user's account may have one or more authentication credentials (e.g., a personal identification number (PIN) and/or one or more biometric credentials) stored in the user profile database under the account. The one or more authentication credentials may be associated with the account identifier. The authentication system may authenticate the user and/or a request for a particular data item or items from the user's account using the one or more authentication credentials (as described in more detail below).

In some implementations, the one or more biometric credentials may be data corresponding to one or more fingerprints (e.g., fingerprint data) of the user (e.g., the account holder) and/or may be a biometric token generated from the fingerprint data. The term "fingerprint," as used herein, is intended to broadly include a print of any digit, including any finger or thumb, and includes a "thumbprint." As an example, the biometric token may be a unique identifier (e.g., a series of alphanumeric characters) for each fingerprint. The biometric token is globally unique (e.g., differs from all other biometric tokens stored in the user profile database under any account). In this respect, the biometric token is distinct from the PIN because multiple users and/or accounts may have the same PIN, whereas each biometric token is unique to a user and/or a corresponding fingerprint of the user. Additionally, the biometric token may be smaller (e.g., require less storage space and/or memory) than the fingerprint data, which conserves memory resources during an authentication process.

In some implementations, the account may have multiple users associated with the account identifier (e.g., multiple joint account holders or users otherwise associated with the account). The user profile database may store authentication credentials (e.g., PIN and/or biometric credentials) for each user. For example, each user may have stored in the user profile database a PIN, fingerprint data corresponding to one or more fingerprints of the particular user, and one or more biometric tokens generated from the fingerprint data for each fingerprint. Each user may also have a user identifier (e.g., name) with which the authentic credentials may be associated, such that the particular user may be identified from the corresponding authentication credentials.

Figure 1B:
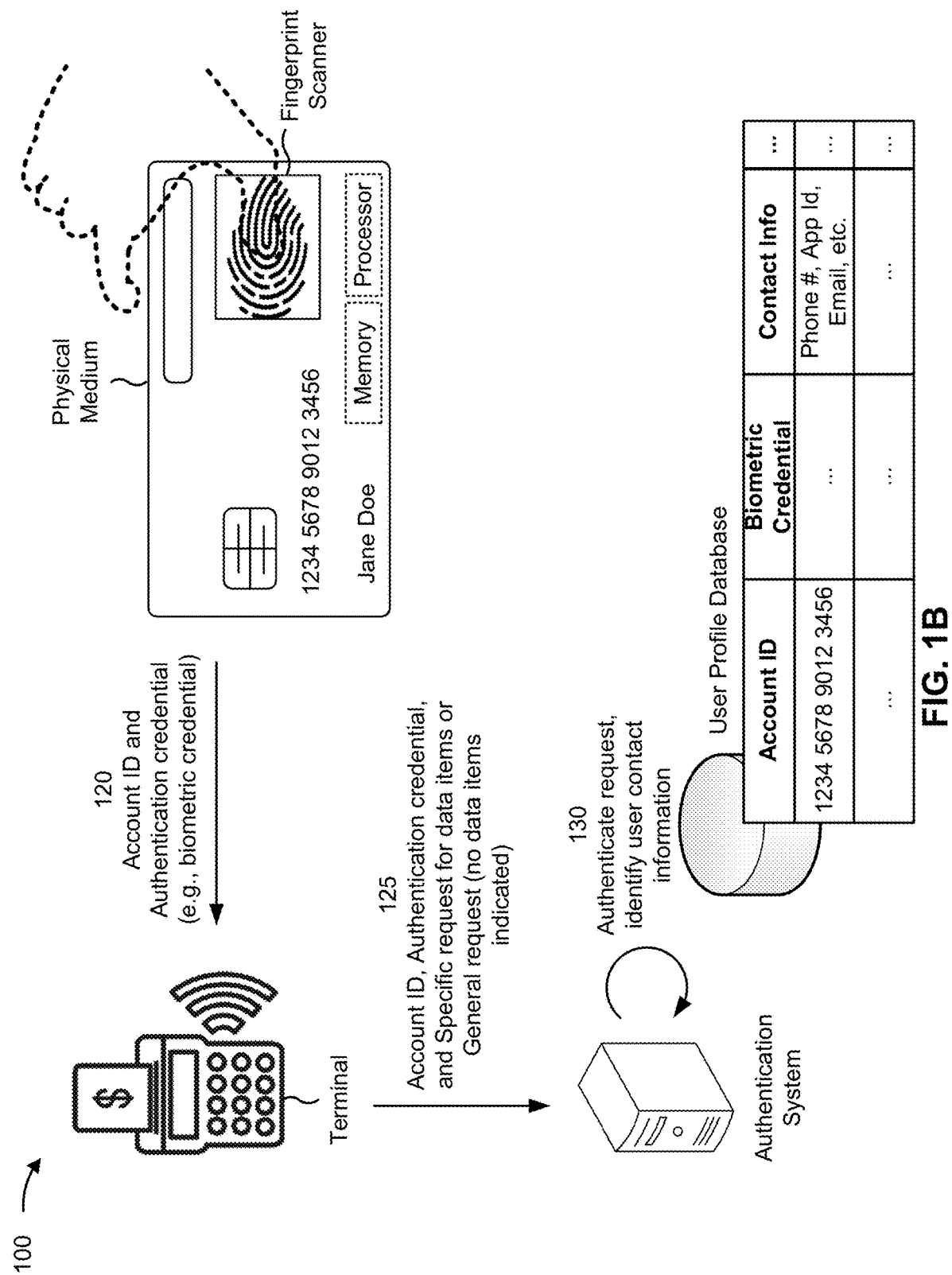

As shown in FIG. 1B, the user may use a physical medium, such as a transaction card (e.g., automated teller machine (ATM) card, debit card, credit card, or gift card) to participate in an exchange with a third party (e.g., a merchant or service provider). The physical medium may have a processor, a memory, a fingerprint scanner, and an embedded microchip via which the physical medium may receive and/or transmit data. The physical medium may store (e.g., in the memory of the physical medium) the account identifier and one or more authentication credentials (e.g., the PIN associated with the account identifier and/or one or more biometric credentials). The one or more biometric credentials may include fingerprint data corresponding to one or more of the user's fingerprints and/or one or more biometric tokens corresponding to the fingerprint data for each fingerprint. For a particular user, the one or more biometric tokens stored on the physical medium may correspond to (e.g., match) the one or more biometric tokens stored in the user profile database under the user's account (e.g., associated with the account identifier) for that user.

The physical medium may interact with a terminal (e.g., a point-of-sale (PoS) terminal) of the third party either by direct physical contact with the terminal or by being in close proximity to the terminal. For example, the user may tap the physical medium to a designated surface of the terminal, may swipe the physical medium in a card slot of the terminal, or may insert the physical medium into a chip reader of the terminal. The terminal may provide power to the physical medium by way of the interaction between the physical medium and the terminal. In some implementations, the physical card may have a radio frequency antenna that communicates with the terminal via near-field communication (NFC) or radio frequency identification (RFID) to enable the physical medium to receive the power via electromagnetic induction. Additionally, or alternatively, the physical medium may have a magnetic stripe that may enable the physical medium to receive the power from the terminal via electromagnetic induction. Additionally, or alternatively, the physical medium may include an integrated circuit (e.g., a chip) that enables the physical medium to receive power upon insertion of the physical medium into the chip reader of the terminal. The power received from the terminal may activate the functionality of the physical medium (e.g., the fingerprint scanner).

After the physical medium is activated via the power from the terminal, the fingerprint scanner may scan a fingerprint of the user to enable the user to use the physical medium in the exchange. For example, the fingerprint scanner may detect a user interaction with the fingerprint scanner (e.g., the user's finger pressing on the fingerprint scanner one or more times) until the physical medium determines that the scan of the fingerprint is complete (e.g., the scan satisfies a threshold amount of unique identifier information, or minutiae points, captured from the scan). The physical medium may provide a notification (e.g., a sound or a light) that the scan is complete, allowing the user to remove the user's finger from the fingerprint scanner. Alternatively, the user may be required to maintain the user's finger on the fingerprint scanner even after the scan has completed in order for the physical medium to function. The scan of the fingerprint may be in the form of data associated with the fingerprint (e.g., fingerprint data). For example, the scan may be a digital representation of the scanned fingerprint, such as multiple minutiae points (e.g., 17 to 35 minutiae points).

The physical medium, using the power received from the terminal, may then compare the scanned fingerprint data and the stored fingerprint data (e.g., stored in the memory of the physical medium) and determine if there is a sufficient match between the scanned fingerprint data and the stored fingerprint data. For example, the physical medium may determine that the scanned fingerprint data sufficiently matches the stored fingerprint data if at least a threshold number of minutiae points match (e.g., at least 10 minutiae points). As shown by reference number 120, after the physical medium detects a sufficient match, the physical medium may transmit the account identifier (e.g., a PAN) and the authentication credential (e.g., the biometric credential and/or the PIN) to the terminal (e.g., via the NFC, RFID, magnetic stripe, or chip connection powering the physical medium).

As shown by reference number 125, the authentication system may receive, from the terminal, the account identifier, the authentication credential, and a request for a data item or items. The request may be a specific request (e.g., specific data item or items are indicated in the request) or a general request (e.g., no data items are indicated in the request), as described in more detail below. The request may include information relating to the exchange (e.g., an amount of the exchange, a third party identifier, and/or a third party type).

As shown by reference number 130, the authentication system may authenticate the request from the terminal. For example, the authentication system may search the user profile database for a stored account identifier that matches the received account identifier, and then compare the received PIN with the stored PIN associated with the account identifier. Additionally, or alternatively, the authentication system may compare the received biometric credential (e.g., biometric token) with the stored biometric credential associated with the account identifier. If there is a match (e.g., the received authentication credential is identical to the stored authentication credential), then the processing system may determine that the request is authentic (e.g., from a third party in an exchange with an authorized user). If there is not a match, then the authentication system may automatically decline the request. Additionally, or alternatively, the authentication system may send a notification to the user (e.g., the user device) that an unauthenticated request for data was received. The notification may include such information as the third party making the request and the particular data item or items being requested. The user may then be able to still choose to provide the requested data item or items despite the request not being authenticated, in a manner as described below. As further shown by reference number 130, after the authentication system authenticates the request, the authentication system may identify the user contact information (e.g., phone number, application ID, email address) of the user, such that the user may be contacted regarding the request, as described in more detail below. The authentication system may identify the user contact information based on the association with the account identifier.

In implementations in which the account has multiple users (e.g., multiple account holders), each user may have the user's own contact information stored in the account and associated with the account identifier and/or user identifier. After the authentication system has authenticated the request, the authentication system may identify the particular user (e.g., the user identifier) participating in the exchange. For example, from the stored biometric credential substantially matching the received biometric credential in the authentication process, the authentication system may identify the user identifier associated with the stored biometric credential). Then, the authentication system may identify the contact information associated with that user identifier.

Figure 1C:
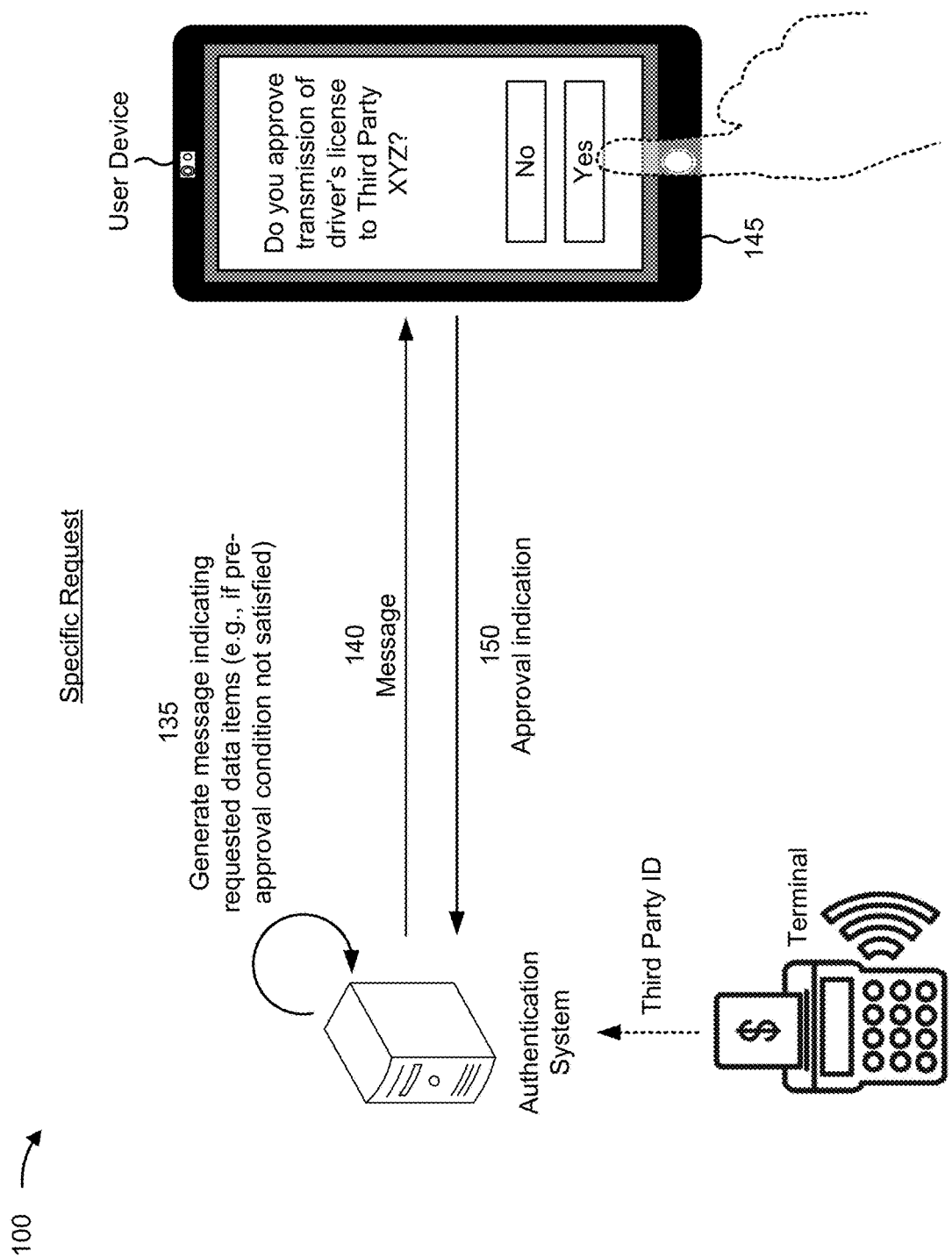

As shown in FIG. 1C, as explained above, the terminal may send a specific request (e.g., indicating a specific data item or items being requested). In addition to the requested data item or items, the request may include information related to the exchange, such as a third party identifier (e.g., the name of the third party in the exchange requesting the data item or items), a third party type (e.g., merchant, service provider, rental company, travel agency, government agency, or financial institution), the date and time of the exchange and/or of the request, and/or the amount of the exchange.

After authenticating the request, the authentication system may determine if the specific request satisfies one or more pre-approval conditions. If the specific request satisfies one or more pre-approval conditions, then the authentication system may automatically approve the request (e.g., without an exchange of messages with the user device after receiving the request). In some implementations, the pre-approval condition may be based on the requested data item or items. For example, a particular requested data item (e.g., the user's driver's license) may be pre-approved to be provided to the third party (e.g., a specific third party, a third party having a particular third party type, or any third party, depending on a user setting). The authentication system may store a pre-approval list of pre-approved items and/or categories of items (e.g., an item falling within the category may satisfy the pre-approval condition). The particular items and/or categories on the pre-approval list may be added and/or removed by the user (e.g., via the application on the user device).

Additionally, or alternatively, the pre-approval condition may be based on a third party identifier and/or third party type associated with the request. For example, if the third party identifier is on a pre-approved third party list and/or the third party type is on a pre-approved third party type list (e.g., as stored and/or maintained by the authentication system), then the pre-approval condition may be satisfied and the request automatically approved. Conversely, if the third party identifier and/or the third party type are on a blacklist (e.g., as stored and/or maintained by the authentication system), then the request may be automatically declined (e.g., without transmitting and/or enabling access to the requested data items). The particular third party identifiers and/or types included on respective pre-approval lists and/or blacklists may be added and/or removed by the user (e.g., via the application on the user device).

Additionally, or alternatively, the pre-approval condition may be based on a date and/or time associated with the exchange and/or the request (e.g., if the request is received at a different day and/or time from the exchange). For example, the pre-approval condition may set particular days of the week (e.g., weekdays), particular times in a day (e.g., business hours) and/or specific dates in which an exchange and/or a request may be pre-approved. The days and/or times may be set by the user (e.g., via the application on the user device), and may be stored by the authentication system.

Additionally, or alternatively, the pre-approval condition may be based on an amount of the exchange (e.g., if the interaction between the physical medium and the terminal is for an exchange, such as a payment or transaction). For example, if the amount of the exchange satisfies a threshold amount (e.g., is less than the threshold amount or is less than or equal to the threshold amount), then the pre-approval condition may be satisfied, and the requested data item (e.g., a PIN) may be provided. Additionally, or alternatively, the pre-approval condition may be based on an electronic calendar and/or an email confirmation associated with the user. For example, the authentication system may have access to and/or be linked to the user's calendar and/or email (e.g., via the application installed on the user device) to determine when the user will be at a particular merchant or third party (e.g., doctor appointment, concert, or rental appointment), and may automatically approve requests associated with that merchant or third party.

While no approval from the user or account holder is necessary if the specific request satisfies one or more pre-approval conditions, the authentication system may still transmit a notification to the user device (e.g., based on the contact information associated with the account identifier and stored in the user profile database). The notification may include a message that a request was made and approved. The message may also include information relating to the exchange and/or request (e.g., third party identifier, third party type, the date and time of the exchange and/or of the request, and/or the amount of the exchange). The message may further provide the user or account holder the option to still decline the request. For example, there may be a set delay between approving the request (via the pre-approval as determined by the authentication system) and providing the requested data item or items. During this delay, the user or account holder may opt to decline the request.

As shown by reference number 135, if the specific request does not satisfy a pre-approval condition (or in implementations where pre-approval conditions are not used), the authentication system may generate content for a message to the user device (e.g., a first message) indicating the requested data item or items (e.g., based on the request being the specific request). As shown by reference number 140, the authentication system may transmit the message to the user device (e.g., based on the contact information associated with the account identifier and stored in the user profile database). As shown by reference number 145, the user device may display the message (e.g., on the display of the user device). The message may request the user's approval to provide the requested data item or items (e.g., the user's driver's license). The content of the message may also include information relating to the exchange and/or request (e.g., third party identifier, third party type, the date and time of the exchange and/or of the request, and/or the amount of the exchange). The user may input, using the user device (e.g., via a button on a touchscreen display of the user device), an indication approving or declining transmission of the requested data item or items. As shown by reference number 150, the authentication system may receive the indication (e.g., an approval indication) from the user device.

Figure 1D:
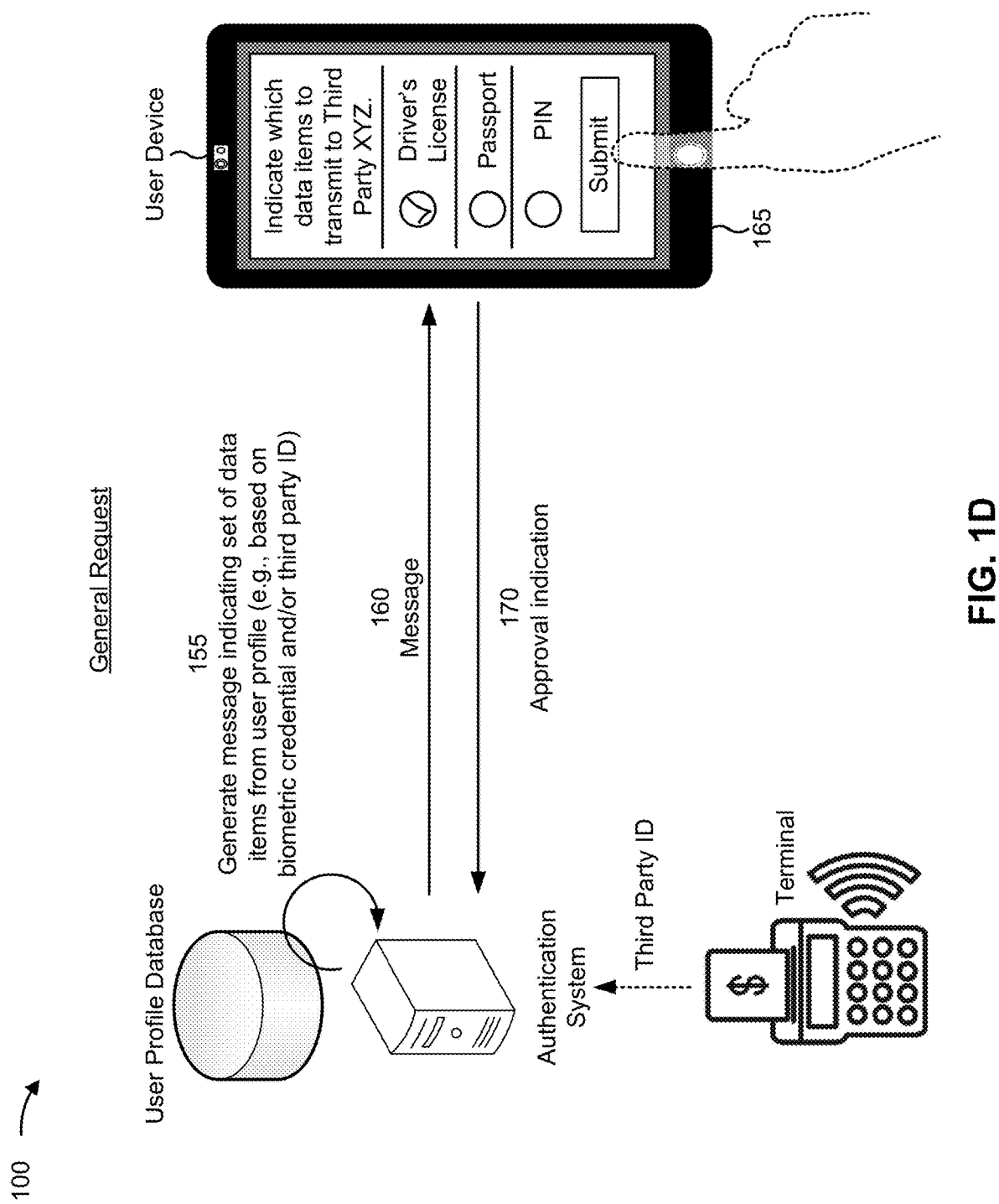

As shown in FIG. 1D, as explained above, the terminal may alternatively send a general request (e.g., where no data item or items are indicated in the request), as opposed to the specific request described above in connection with FIG. 1C. The request may include information related to the exchange (e.g., the third party identifier, the third party type, the date and time of the exchange and/or of the request, and/or the amount of the exchange). The authentication system may determine that the request is a general request if it does not detect any data item or items indicated in the request. In some implementations, a specific request and a general request may have different formats (e.g., may include different fields of information) and/or may be different sizes (e.g., a general request may be smaller in size than a specific request). The authentication system may differentiate between a specific request and a general request based on the format of the request and/or the size of the request. As shown by reference number 155, the authentication system may generate content for a message to the user. The content may indicate data items from which the user may choose to provide to the third party to satisfy the general request.

To identify the data items to include in the content of the message, the authentication system may identify all the data items associated with the account identifier and stored in the user profile database under the account associated with the account identifier, and may indicate all of those data items in the message. When multiple users (e.g., multiple joint account holders) are associated with the account identifier, the authentication system may identify a set of data items based on the account identifier and the authentication credential (e.g., PIN and/or biometric credential) received from the terminal. For example, based on the authentication credential (e.g., the biometric credential) received from the terminal with the request, the authentication system may identify the particular user and all of the data item or items stored in the user profile database for that user. The content of the message may indicate the data items stored in the user profile database for just that user. This may reduce a size of the message by indicating, in the message, only data items that are relevant to a particular user of an account, rather than all data items associated with the account (and all users of the account). In this case, the account database may store information to differentiate among data items for different users (e.g., a first set of data items may be associated with a first user, a second set of data items may be associated with a second user, and so on).

Additionally, or alternatively, the authentication system may identify a set of data items based on the account identifier and the third party identifier and/or third party type. For example, the authentication system may have and/or may access (e.g., over the network) a third party database. The third party database may include a list of third parties, and for each third party, a list of particular types of data items needed by and/or associated with the third party. The third party database may also include a list of third party types, and for each third party type, a list of particular types of data items associated with the third party type. This may reduce a size of the message by indicating, in the message, only data items that are relevant to a particular third party or third party type, rather than all data items associated with the account.

As shown by reference number 160, the authentication system may transmit the message to the user device (e.g., based on the contact information associated with the account identifier and stored in the user profile database). As shown by reference number 165, the user device may display the message (e.g., on the display of the user device). The content of the message may indicate a set of data items identified by the authentication system to provide to a third party (e.g., based on the request being the general request). The message may further allow the user to specify which of the data item or items the user desires to provide to the third party, and to submit that selection (e.g., via a button on the touchscreen display of the user device) to the authentication system. As shown by reference number 170, the authentication system may receive an indication (e.g., an approval indication) from the user device. The approval indication may include the user-specified data items to provide to the third party, which may be a subset of the total set of data items indicated in the message. For example, as shown in FIG. 1D, the user may specify a single data item (e.g., the user's driver's license) from a list of multiple data items to provide to the third party. Alternatively, the user may specify multiple data items or all of the data items.

Figure 1E:
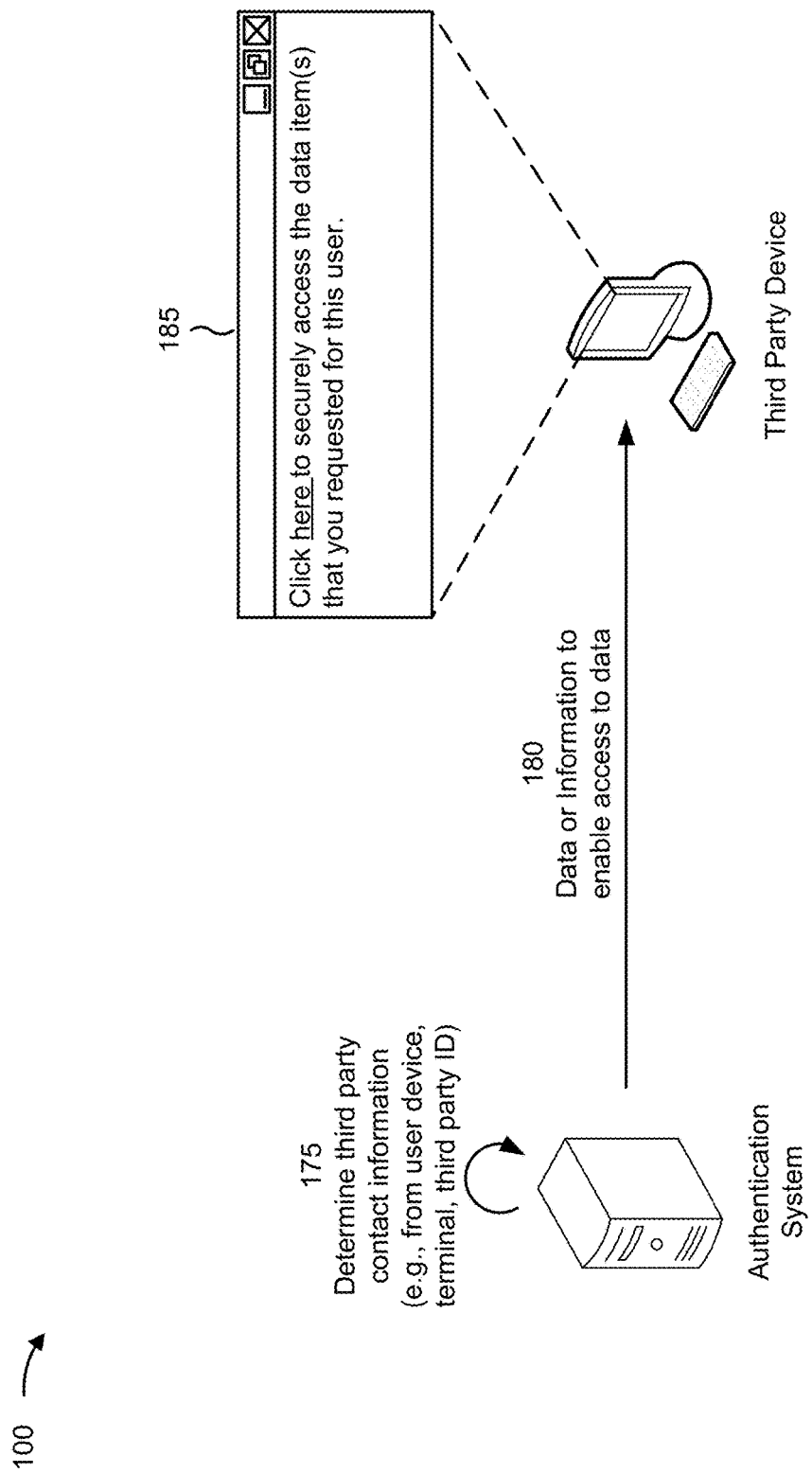

As shown in FIG. 1E, and by reference number 175, the authentication system may determine contact information of the third party (sometimes called "third party contact information"). The authentication system may obtain the information from the user device, the terminal, or the third party identifier. For example, the authentication system may receive the third party contact information from the terminal (e.g., with the request). Additionally, or alternatively, the authentication system may have and/or have access to (e.g., over the network) a third party profile database, which may include profiles for multiple third parties each associated with a third party identifier. The third party profiles may include the third party contact information. The authentication system may receive the third party identifier from the terminal, and may identify the third party contact information based on the third party identifier and third party profile. Additionally, or alternatively, the authentication system may receive the third party contact information from the user device (e.g., in the approval indication). For example, after authenticating the request, if the authentication system determines that it has not received and/or does not have stored the third party contact information, the authentication system may generate the message to the user device (e.g., the first message) to include an input element (e.g., one or more input fields) for the user to input the third party contact information.

As shown by reference number 180, the authentication system may transmit, to a third party device associated with the third party, the data item or items or information to enable access to the data item or items. For example, the authentication system may send a message (e.g., a second message) to a third party device (e.g., a device at the third party location). As shown by reference number 185, the message may be in the form of an electronic message (e.g., an email, a short message service (SMS) text, or an internal message in an application stored on the third party device or a web-based application accessed on the third party device over a network). The message may contain the data item or items in the message (e.g., in the text of the message) and/or attached to the message (e.g., a photo or an attached document). Additionally, or alternatively, as further shown in FIG. 1E, the message may include a link to a remote location (e.g., the user profile database or a separate cloud computing environment) where the data item or items may be securely accessible by the third party.

If the request is a specific request, the data item or items may include the specific data item or items from the request. If the request is a general request, the data item or items may include the user-specified data items. For a specific request, if the data items stored in the user profile database under the account identifier and/or the user identifier do not include one or more of the requested data item or items, the authentication system may transmit a notification to the user (e.g., in the first message or in a separate message) indicating the missing data item or items. The notification may provide the user an option to provide (e.g., via the user device) the missing data item or items (e.g., taking a picture, uploading the data item or items from the internal storage of the user device, obtaining the data item or items from a remote server or database, and/or providing permission for the authentication system to obtain the data item or items). Additionally, or alternatively, the notification may include a message for the user to directly provide the missing data item or items to the third party.

In some implementations, to add an extra layer of security, the authentication system may generate a passcode (e.g., a series of alphanumeric characters) for authenticating access to the data item or items. The authentication system may transmit the passcode to the user device (e.g., so that the user may communicate the passcode to the third party, such as via verbal communication). When the third party attempts to access (e.g., via the third party device) the data item or items (e.g., by opening an attachment or clicking a link), the authentication system may receive an access request, and in response, may prompt input of the passcode. If the authentication system receives a valid passcode (e.g., that matches the passcode provided to the user device), then the authentication system may provide access to the data item or items. The prompt may have a set number of attempts for the third party to input the correct passcode. If the number of failed attempts exceeds this set number, the authentication system may deny access to the data item or items. Additionally, or alternatively, the passcode may have a set duration (e.g., 30 minutes or 24 hours) that the passcode may be valid. After expiration of this set duration, the authentication system may deny access to the data item or items. Additionally, the third party's access to the information may be indefinite (e.g., until the user affirmatively revokes access, such as through the application installed on the user device). Alternatively, the third party's access to the information may expire after a threshold duration of time (e.g., 30 days), after which the link and/or passcode provided to the third party to access the information may no longer be valid.

In some implementations, the third party may be able to indicate (e.g., via the third party device) whether or not the provided data item or items received was correct, incorrect, invalid, and/or incomplete. For example, the message sent to the third party device by the authentication system may cause one or more buttons or links to be displayed on the third party device, which may be pressed to confirm that the request is satisfied and/or that the request is not satisfied. If the third party user presses a button or link to indicate that the request is satisfied, then the authentication system may close the request. Additionally, or alternatively, the authentication system may send a message to the user device to indicate that the request has been satisfied. If the third party user presses a button or link to indicate that the request is not satisfied, then the authentication system may send a message to the user device to indicate that the request has not been satisfied. Additionally, or alternatively, the third party device may be directed to provide details about the reasons that the request is not satisfied (e.g., not all the data items were provided, one or more data items were invalid, incorrect, and/or expired), for example, by directing the third party device to a website. The reasons may be presented on the third party device as selectable preset options and/or as an entry field for the third party user to enter manually. The message to the user device indicating that the request has not been satisfied may include the reasons provided by the third party.

The system described above offers multiple levels of security and/or privacy for a user (e.g., an account holder) to share data. For example, utilizing authentication credentials (e.g., PIN and/or biometric credentials) first in an exchange between the user and the third party (via an interaction between the physical medium and the terminal) and then again to authenticate the request for data provides a first layer of security. Then, prompting the user to approve providing the requested data item or items (e.g., for a specific request) and/or to specify the data item or items to provide adds another layer of security. As such, even if the physical medium was stolen and a fingerprint was lifted and used, thereby bypassing the first layer of security, an unauthorized user would not be able to have data in connection with an unauthorized exchange sent to a third party. Additionally, by having the data items stored and provided from a single location (e.g., the authentication system), data may be provided to multiple third parties across different exchanges, thereby saving processing time and resources compared to identifying and providing specific data items from different sources for each exchange.

As indicated above, FIGS. 1A-1E are provided as an example. Other examples may differ from what is described with regard to FIGS. 1A-1E.

Figure 2:
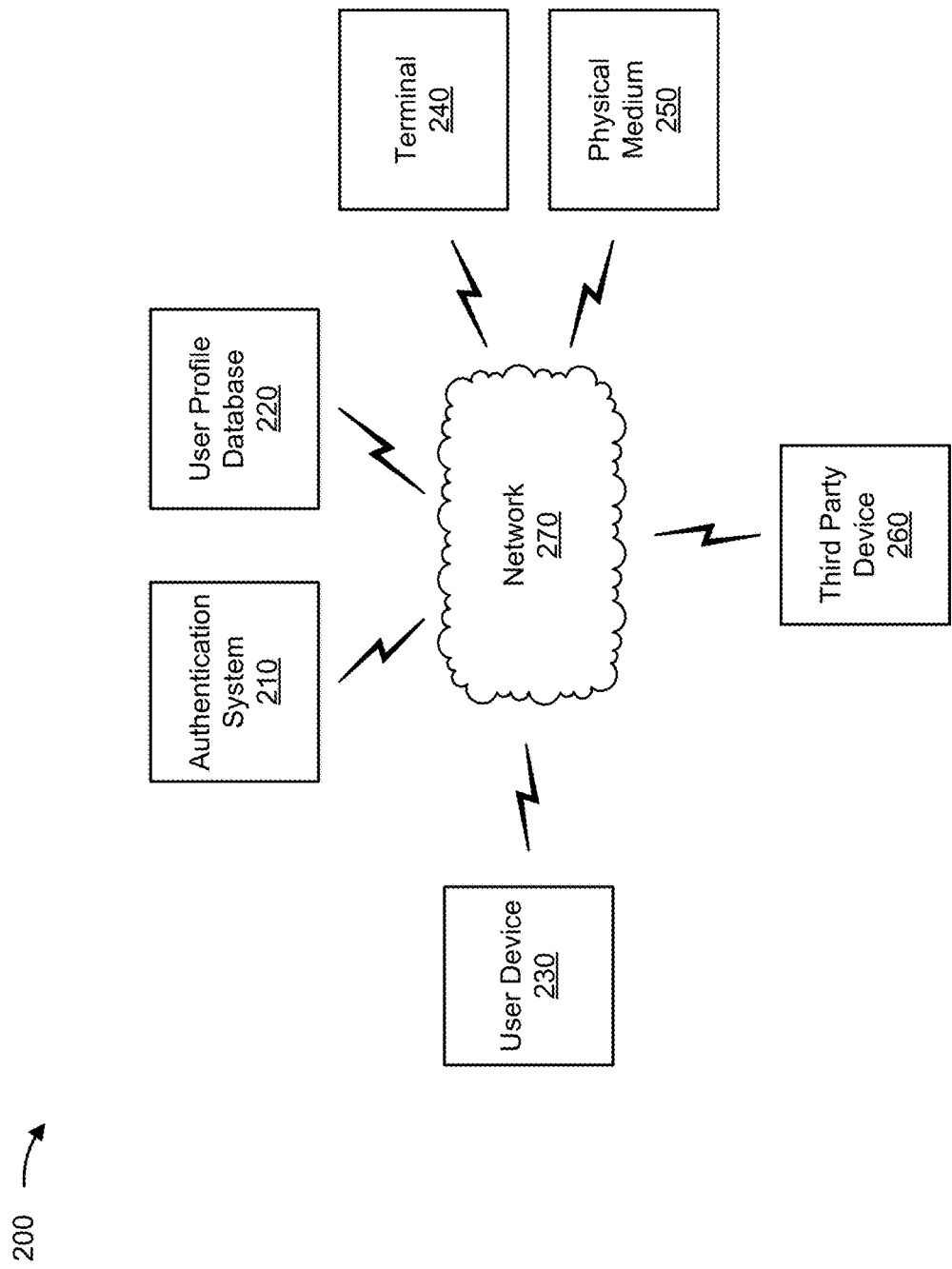
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an authentication system 210, a user profile database 220, a user device 230, a terminal 240, a physical medium 250, a third party device 260, and a network 270. Devices of environment 200 may interconnect via wired connections, wireless connections, or a combination of wired and wireless connections.

The authentication system 210 includes one or more devices capable of processing, authorizing, and/or facilitating an exchange (e.g., a transaction). For example, the authentication system 210 may include one or more servers and/or computing hardware (e.g., in a cloud computing environment or separate from a cloud computing environment) configured to receive and/or store information associated with processing an electronic exchange. The authentication system 210 may process an exchange, such as to approve (e.g., permit, authorize, or the like) or decline (e.g., reject, deny, or the like) the exchange and/or to complete the exchange if the exchange is approved. The authentication system 210 may process the exchange based on information received from a terminal, such as exchange data (e.g., information that identifies an exchange amount, a merchant, a time of a transaction, a location of the exchange, or the like), account information communicated to the terminal by a physical medium (e.g., a transaction card, a mobile device executing an application, or the like) and/or information stored by the authentication system 210 (e.g., for fraud detection).

The authentication system 210 may be associated with a financial institution (e.g., a bank, a lender, a credit card company, or a credit union) and/or may be associated with a transaction card association that authorizes an exchange and/or facilitates a transfer of funds. For example, the authentication system 210 may be associated with an issuing bank associated with the physical medium, an acquiring bank (or merchant bank) associated with the merchant and/or the terminal, and/or a transaction card association (e.g., VISA® or MASTERCARD®) associated with the physical medium. Based on receiving information associated with the physical medium from the terminal, one or more devices of the authentication system 210 may communicate to authorize an exchange and/or to transfer funds from an account associated with the physical medium to an account of an entity (e.g., a merchant) associated with the terminal.

The user profile database 220 includes one or more devices capable of receiving, generating, storing, processing, and/or providing information associated with authentication of data sharing, as described elsewhere herein. The user profile database 220 may include a communication device and/or a computing device. For example, the user profile database 220 may include a data structure, a database, a data source, a server, a database server, or a similar type of device. As an example, the user profile database 220 may store account information, including an account identifier, a PIN, one or more biometric credentials (e.g., fingerprint data and biometric tokens), data items associated with a user or account holder, and user or account holder contact information, as described elsewhere herein.

The user device 230 includes one or more devices capable of receiving, generating, storing, processing, and/or providing information associated with authentication of data sharing, as described elsewhere herein. The user device 230 may include a communication device and/or a computing device. For example, the user device 230 may include a wireless communication device, a mobile phone, a laptop computer, a tablet computer, a desktop computer, or a similar type of device.

The terminal 240 includes one or more devices capable of facilitating an electronic exchange. For example, the terminal 240 may include a PoS terminal, a payment terminal (e.g., a credit card terminal, a contactless payment terminal, a mobile credit card reader, or a chip reader), a secure access terminal (e.g., a terminal equipped with an encrypted connection to a server and/or database), a financial service kiosk (e.g., a banking kiosk), and/or an ATM. The terminal 240 may include one or more input components and/or one or more output components to facilitate obtaining data (e.g., account information) from a physical medium (e.g., a transaction card, a mobile device executing an payment application, or the like) and/or to facilitate interaction with and/or authorization from an owner or accountholder of the physical medium. Example input components of the terminal 240 include a number keypad, a touchscreen, a magnetic stripe reader, a chip reader, and/or an RF signal reader (e.g., an NFC reader). Example output devices of the terminal 240 include a display and/or a speaker.

The physical medium 250 may be a device capable of being used for an electronic exchange. The physical medium 250 may include integrated circuitry capable of storing and communicating account information. For example, the physical medium 250 may be a transaction card, such as a credit card, a debit card, a gift card, an ATM card, a transit card, a fare card, and/or an access card. The physical medium 250 may store account information associated with the physical medium 250, which may be used in connection with an electronic exchange. The account information may include, for example, an account identifier that identifies an account (e.g., a bank account or a credit account) associated with the physical medium 250 (e.g., an account number, a card number, a bank routing number, and/or a bank identifier), a cardholder identifier (e.g., identifying a name of a person, business, or entity associated with the account or the physical medium 250), expiration information (e.g., identifying an expiration month and/or an expiration year associated with the physical medium 250), and/or a credential (e.g., a payment token). In some implementations, the physical medium 250 may store the account information in tamper-resistant memory of the physical medium 250, such as in a secure element. As part of performing an electronic exchange, the physical medium 250 may transmit the account information to a terminal using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the physical medium 250 and the terminal may communicate with one another by coming into contact with one another (e.g., using a magnetic stripe or an EMV chip) or via contactless communication (e.g., using NFC). As described above, the physical medium 250 may include a fingerprint scanner, memory, and one or more processors.

The third party device 260 includes one or more devices capable of receiving, generating, storing, processing, and/or providing information associated with authentication of data sharing, as described elsewhere herein. The third party device 260 may include a communication device and/or a computing device. For example, the third party device 260 may include a wireless communication device, a mobile phone, a user equipment, a laptop computer, a tablet computer, a desktop computer, or a similar type of device.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
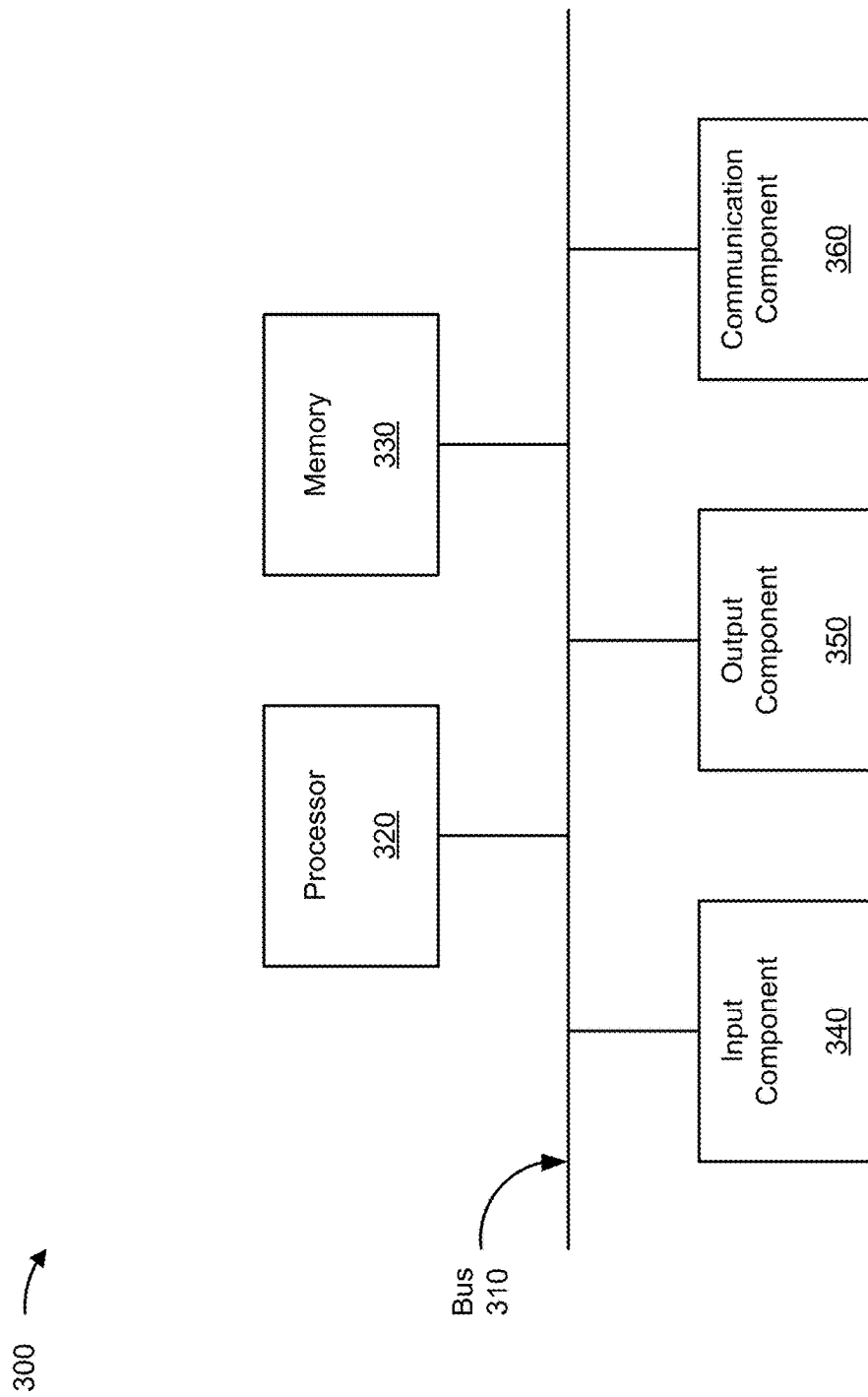
FIG. 3 is a diagram of example components of one or more devices of FIG. 2.

FIG. 3 is a diagram of example components of a device 300, which may correspond to the authentication system 210, the user profile database 220, the user device 230, the terminal 240, the physical medium 250, and/or the third party device 260. In some implementations, the authentication system 210, the user profile database 220, the user device 230, the terminal 240, the physical medium 250, and/or the third party device 260 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Figure 4:
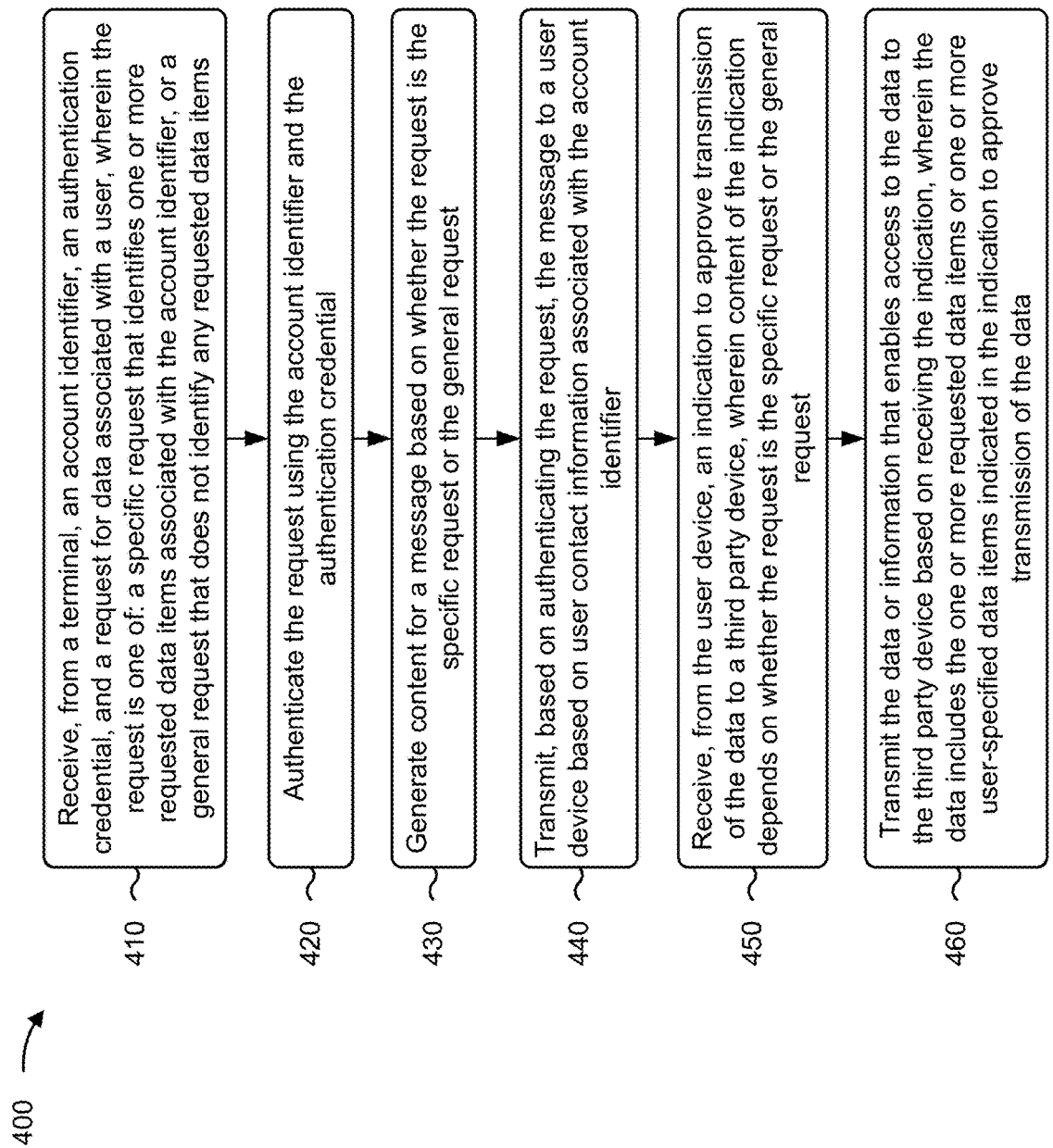
FIGS. 4 and 5 are flowcharts of example processes relating to authentication of data sharing.

FIG. 4 is a flowchart of an example process 400 associated with authentication of data sharing. In some implementations, one or more process blocks of FIG. 4 may be performed by a system (e.g., authentication system 210). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from a terminal, an account identifier, an authentication credential, and a request for data associated with a user (block 410). The request may be one of: a specific request that identifies one or more requested data items associated with the account identifier, or a general request that does not identify any requested data items. As further shown in FIG. 4, process 400 may include authenticating the request using the account identifier and the authentication credential (block 420). As further shown in FIG. 4, process 400 may include generating content for a message based on whether the request is the specific request or the general request (block 430). As further shown in FIG. 4, process 400 may include transmitting, based on authenticating the request, the message to a user device based on user contact information associated with the account identifier (block 440). As further shown in FIG. 4, process 400 may include receiving, from the user device, an indication to approve transmission of the data to a third party device, wherein content of the indication depends on whether the request is the specific request or the general request (block 450). As further shown in FIG. 4, process 400 may include transmitting the data, or information that enables access to the data, to the third party device based on receiving the indication, wherein the data includes the one or more requested data items or one or more user-specified data items indicated in the indication to approve transmission of the data (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
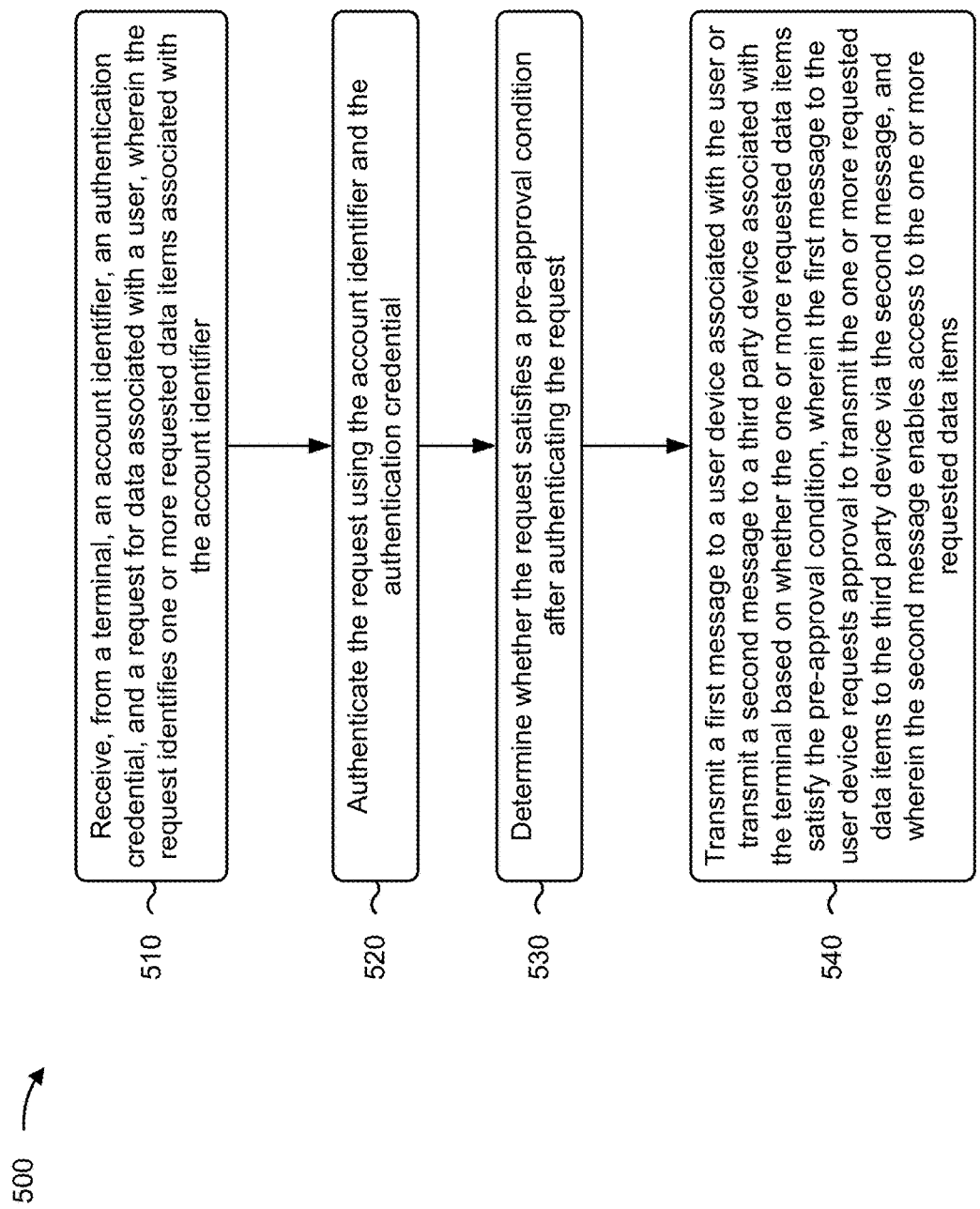

FIG. 5 is a flowchart of an example process 500 associated with authentication of data sharing. In some implementations, one or more process blocks of FIG. 5 may be performed by a system (e.g., authentication system 210). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a terminal, an account identifier, an authentication credential, and a request for data associated with a user, wherein the request identifies one or more requested data items associated with the account identifier (block 510). As further shown in FIG. 5, process 500 may include authenticating the request using the account identifier and the authentication credential (block 520). As further shown in FIG. 5, process 500 may include determining whether the request satisfies a pre-approval condition after authenticating the request (block 530). As further shown in FIG. 5, process 500 may include transmitting a first message to a user device associated with the user or transmit a second message to a third party device associated with the terminal based on whether the one or more requested data items satisfy the pre-approval condition (540). The first message to the user device requests approval to transmit the one or more requested data items to the third party device via the second message, and the second message enables access to the one or more requested data items.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authentication of data sharing, the system comprising:
one or more memories; and
one or more processors, communicatively coupled to the one or more memories, configured to:
receive, from a terminal, an account identifier, a biometric credential, and a request for data associated with a user based on an interaction between the terminal and a physical medium associated with the account identifier,
wherein the biometric credential is communicated from the physical medium to the terminal, and
wherein the request is one of:
a specific request that identifies one or more requested data items associated with the account identifier, or a general request that does not identify any requested data items;
authenticate the request using the biometric credential;
identify user contact information associated with the account identifier based on authenticating the request;
transmit a message to a user device based on the user contact information, wherein content of the message depends on whether the request is the specific request or the general request;
receive, from the user device, an indication to approve transmission of the data to a third party device associated with the terminal,
wherein the indication approves transmission of the one or more requested data items if the request is the specific request, or
wherein the indication indicates one or more user-specified data items to be transmitted to the third party device if the request is the general request; and
transmit the data or information that enables access to the data to the third party device based on receiving the indication,
wherein the data includes the one or more requested data items if the request is the specific request, or
wherein the data includes the one or more user-specified data items if the request is the general request.

2. The system of claim 1, wherein the one or more processors are configured to identify all data items associated with the account identifier; and
wherein the content of the message indicates all of the data items associated with the account identifier based on the request being the general request.

3. The system of claim 1, wherein the one or more processors are further configured to:
receive, from the terminal, a third party identifier that identifies a third party making the request; and
identify a set of data items based on the account identifier and the third party identifier; and
wherein the content of the message indicates the set of data items based on the request being the general request.

4. The system of claim 1, wherein the one or more processors are further configured to:
identify a set of data items based on the account identifier and the biometric credential, wherein different users associated with the account identifier are associated with different biometric credentials; and
wherein the content of the message indicates the set of data items based on the request being the general request.

5. The system of claim 1, wherein the one or more processors, to identify the user contact information associated with the account identifier, are configured to:
identify the user contact information based on the account identifier and the biometric credential; and
wherein different users associated with the account identifier are associated with different user contact information.

6. The system of claim 1, wherein the content of the message indicates a set of data items identified by the system based on the request being the general request.

7. The system of claim 6, wherein the one or more user-specified data items are a subset of data items included in the set of data items.

8. The system of claim 1, wherein the content of the message indicates the one or more requested data items based on the request being the specific request.

9. A method for authentication of data sharing, comprising:
receiving, by a system and from a terminal, an account identifier, an authentication credential, and a request for data associated with a user based on an interaction between the terminal and a physical medium that stores the account identifier and the authentication credential, wherein the authentication credential and the account identifier are communicated from the physical medium to the terminal, and
wherein the request is one of:
a specific request that identifies one or more requested data items associated with the account identifier, or
a general request that does not identify any requested data items;
authenticating, by the system, the request using the account identifier and the authentication credential;
generating, by the system, content for a message based on whether the request is the specific request or the general request;
transmitting, by the system and based on authenticating the request, the message to a user device based on user contact information associated with the account identifier;
receiving, by the system and from the user device, an indication to approve transmission of the data to a third party device,
wherein content of the indication depends on whether the request is the specific request or the general request; and
transmitting, by the system, the data, or information that enables access to the data, to the third party device based on receiving the indication,
wherein the data includes the one or more requested data items or one or more user-specified data items indicated in the indication to approve transmission of the data.

10. The method of claim 9, wherein the authentication credential is a biometric credential that is received from the terminal based on the terminal powering the physical medium for fingerprint authentication by the physical medium.

11. The method of claim 9, further comprising receiving third party contact information from the terminal; and
wherein the data or the information that enables access to the data is transmitted to the third party device using the third party contact information.

12. The method of claim 9, further comprising:
receiving a third party identifier from the terminal; and
identifying third party contact information based on the third party identifier and a third party profile associated with the third party identifier; and
wherein the data or the information that enables access to the data is transmitted to the third party device using the third party contact information.

13. The method of claim 9, wherein generating the message comprises generating the message to include an input element for input of third party contact information based on a determination that the system has not received or does not store the third party contact information; and
further comprising receiving the third party contact information from the user device based on the message; and wherein the data or the information that enables access to the data is transmitted to the third party device using the third party contact information.

14. The method of claim 9, further comprising:
generating a passcode for authenticating access to the data;
transmitting the passcode to the user device;
receiving, from the third party device, an access request to access the data;
prompting input of the passcode based on the access request; and
providing access to the data based on authentication of the passcode.

15. The method of claim 9, wherein the data includes at least one of driver's license information, passport information, government-issued identification, a social security number, a credit score, birth certificate information, vaccination record information, a personal identification number, an access identifier, ticket information, a video file, an audio file, or information that identifies an age of the user.

16. A non-transitory computer-readable medium storing a set of instructions, the set of instructions comprising:
one or more instructions that, when executed by one or more processors of a system, cause the system to:
receive, from a terminal, an account identifier, an authentication credential, and a request for data associated with a user based on an interaction between the terminal and a physical medium that stores the account identifier and the authentication credential,
wherein the authentication credential and the account identifier are communicated from the physical medium to the terminal, and
wherein the request identifies one or more requested data items associated with the account identifier;
authenticate the request using the account identifier and the authentication credential;
determine whether the request satisfies a pre-approval condition after authenticating the request; and
transmit a first message to a user device associated with the user or transmit a second message to a third party device associated with the terminal based on whether the one or more requested data items satisfy the pre-approval condition,
wherein the first message to the user device is transmitted if the one or more requested data items do not satisfy the pre-approval condition,
wherein the second message to the third party device is transmitted if the one or more requested data items satisfy the pre-approval condition,
wherein the first message to the user device requests approval to transmit the one or more requested data items to the third party device via the second message, and
wherein the second message enables access to the one or more requested data items.

17. The non-transitory computer-readable medium of claim 16, wherein the pre-approval condition is based on one or more of:
the one or more requested data items,
a third party identifier associated with the request,
a third party type associated with the request, or
a date or time associated with the request.

18. The non-transitory computer-readable medium of claim 16, wherein the request is associated with an exchange, and wherein the pre-approval condition is based on an amount of the exchange.

19. The non-transitory computer-readable medium of claim 16, wherein the pre-approval condition is based on an electronic calendar associated with the user.

20. The non-transitory computer-readable medium of claim 16, wherein the pre-approval condition is based on an email confirmation associated with the user.

\* \* \* \* \*